United States Patent
Van Blokland

(10) Patent No.: US 8,443,752 B2
(45) Date of Patent: May 21, 2013

(54) METHOD AND DEVICE FOR ARRANGING A SPRINKLING MATERIAL ON A DOUGH PIECE

(75) Inventor: Johannes Josephus Antonius Van Blokland, Beusichem (NL)

(73) Assignee: Rademaker B.V., Culemborg (NL)

( * ) Notice: Subject to any disclaimer, the term of this patent is extended or adjusted under 35 U.S.C. 154(b) by 465 days.

(21) Appl. No.: 12/637,260

(22) Filed: Dec. 14, 2009

(65) Prior Publication Data

US 2010/0183784 A1    Jul. 22, 2010

(30) Foreign Application Priority Data

Dec. 16, 2008   (NL) ..................... 2002331

(51) Int. Cl.
*B05C 5/02*   (2006.01)
*A23G 3/28*   (2006.01)

(52) U.S. Cl.
USPC ............. 118/13; 118/14; 118/30; 118/423; 99/494

(58) Field of Classification Search
USPC .................... 118/13, 14, 30, 423; 99/494
See application file for complete search history.

(56) References Cited

U.S. PATENT DOCUMENTS

| | | | | |
|---|---|---|---|---|
| 2,092,836 | A | * | 9/1937 | Engels et al. ............. 99/352 |
| 3,885,519 | A | * | 5/1975 | Orlowski ............. 118/16 |
| 3,967,583 | A |   | 7/1976 | Booth |
| 4,266,502 | A |   | 5/1981 | Monaco |
| 6,119,624 | A | * | 9/2000 | Morikawa et al. ............. 118/13 |

FOREIGN PATENT DOCUMENTS

| | | |
|---|---|---|
| DE | 3228614 A1 | 2/1984 |
| DE | 3504174 A1 | 11/1985 |
| DE | 20317184 U1 | 1/2004 |
| EP | 1767105 A1 | 3/2007 |
| SU | 242801  * | 5/1969 |
| WO | 0027208 A1 | 5/2000 |

* cited by examiner

*Primary Examiner* — Laura Edwards
(74) *Attorney, Agent, or Firm* — The Webb Law Firm, PC

(57) ABSTRACT

The present invention relates to a method and device for arranging sprinkling material, such as seed, on a dough piece, including at least one member for arranging the sprinkling material on a surface for dough pieces and at least one member for placing the dough piece on the surface provided with the sprinkling material, and also further including in an advantageous embodiment at least one member for applying an adhesive such as water to at least a part of the dough piece to be provided with the sprinkling material, wherein the at least one member for placing the dough piece are adapted to place the dough piece with the part provided with the adhesive facing toward the surface.

10 Claims, 5 Drawing Sheets

METHOD AND DEVICE FOR ARRANGING A SPRINKLING MATERIAL ON A DOUGH PIECE

BACKGROUND OF THE INVENTION

1) Field of the Invention

The present invention relates to a method and device for arranging a sprinkling material on a dough piece. The invention relates particularly to the arranging of seed on a dough piece for a bread dough product such as a bread roll, a puff pastry product such as a croissant, a quiche or a local bread speciality. The invention relates still more particularly to above stated products which are intended for baking (off) and are supplied for this purpose to a consumer optionally packed in frozen state.

2) Description of the Prior Art

The arranging of sprinkling material on dough pieces is per se known. The sprinkling material serves here as flavouring, as decoration or to impart a structure perceived as appetizing to a baked product to be manufactured.

It is known to arrange the sprinkling material on the dough piece by sprinkling the dough piece. This method of application has diverse drawbacks, however. The adhesion of the sprinkling material to the dough product is for instance often mediocre, so that a consumer finds the sprinkling material detached from the dough piece in a packaging, this having an adverse effect on the consumer perception of product quality.

Methods and devices for sprinkling dough pieces also provide insufficient possibilities for arranging the sprinkling material on an underside of the dough piece, and more particularly arranging sprinkling material on both an underside and upper side of a dough piece, since this usually requires turning the dough piece upside down. In the case of some dough pieces, and particularly in the case of an endless dough strip, this is a difficult operation, wherein both the dough piece and a sprinkled layer already arranged on one side can be damaged.

A known device for providing a dough piece with sprinkling material on the underside is adapted to separate from an endless dough strip individual dough pieces which are provided on an upper side with an adhesive and subsequently provided with a sprinkling material, the sprinkling material here being pressed on. The pieces then drop over a predetermined height in the device, wherein they must come to lie with the sprinkled sides facing downward. This process is impossible for endless dough pieces, but also for softer types of dough. In addition, the appropriate predetermined height differs per product type whereby the device has to be reset in each case. Nor can the exact location where the reversed products come to lie on the belt be properly determined, which can make further processing steps more difficult.

It is therefore an object of the present invention to at least partially obviate the above stated drawbacks, or to provide a usable alternative to known methods and devices.

SUMMARY OF THE INVENTION

The invention proposes a device for arranging sprinkling material, such as seed, on a dough piece on an underside of the dough piece, with means for arranging the sprinkling material on a surface for dough pieces, and means for placing the dough piece on the surface provided with the sprinkling material, wherein during arranging of the sprinkling material the device leaves unchanged the side facing toward the surface and the side facing away from the surface, so that sprinkling material can be arranged on dough pieces of indefinite length. Unchanged is understood to mean that the underside and upper side are not interchanged, that the dough piece is not turned over, rotated, twisted or tilted and/or that the side directed toward the surface (for instance a conveyor) is the same side of the dough piece during the whole sprinkling process.

The dough piece is in this way placed in a bed of sprinkling material, this having the result, among others, that due to the pressure caused by the weight of the dough piece a good adhesion of the sprinkling material to the dough piece already occurs. The sprinkling material itself usually consists of particles of a relatively low weight, so that sufficient impetus for a good adhesion does not automatically occur during sprinkling of the dough pieces. A second object which can be realized precisely in this manner is the arranging of the sprinkling material on the underside of the dough piece. The underside is here particularly understood to mean the side which during a further processing, and still more particularly during the baking of the product, is facing downward. The orientation of the product during baking influences the final result. It may thus be desirable for instance that an upper side should be baked darker (browner) than an underside, or that an imprint of a baking grill is desirable on an underside. Because the device according to the present invention does not turn the dough pieces over, dough of indefinite and/or unlimited length can be provided with sprinkling material by the device.

In order to further improve this adhesion, means can be provided for applying to at least a part of the dough piece to be provided with the sprinkling material an adhesive such as water, which can optionally be provided with an additive such as a starch or sugar for the purpose of increasing the adhesive force. The means for placing the dough piece are particularly adapted here to place the dough piece with the part provided with the adhesive facing toward the surface.

Thus is achieved that the dough piece with the part provided with the adhesive is placed in the bed of sprinkling material, thereby further improving the adhesion.

In an advantageous embodiment the surface comprises a first conveyor, such as a conveyor belt for dough pieces. The device can in this way be easily fitted into a bread production line and the possibility is provided of providing the underside of an endless (uninterrupted) or (very) long dough strip with sprinkling material.

It is also advantageous here for the means for placing the dough piece to comprise a second conveyor, such as a conveyor belt. The continuous feed of dough pieces is in this way made possible, and the endless or very long dough strip can also be processed. This conveyor is preferably disposed relative to the first conveyor and the means for applying the adhesive such that it places the dough piece, via the means for applying the adhesive, onto the surface provided with the sprinkling material. The means for applying the adhesive are for instance disposed for this purpose between the second and the first conveyor as seen in a transport route or direction in which the dough pieces are transported.

These means for applying an adhesive can for instance comprise a roller, this roller being provided with means for arranging the adhesive at least on a periphery thereof, so that the adhesive can be transferred to a dough piece guided over the roller. For this purpose the second conveyor is adapted to feed the dough piece over the roller in order to apply the adhesive to an underside of the dough piece.

In order to prevent fouling of the device, collecting means can be provided under this roller for collecting adhesive dropping from the roller or the dough piece, particularly when the roller is placed at a position such that there is the risk of such adhesive dropping onto the surface provided with sprinkling material, for instance when the roller is placed higher than the surface. Such a configuration can advantageously be applied in combination with a second conveyor with a plane of supply of the dough piece which lies higher than or substantially level with an uppermost point of the roller. The dough pieces here make a movement with at least a directional component in the direction of the force of gravity, whereby the transfer from the second conveyor via the roller to the surface takes place almost automatically. The roller can here be driven if desired, but also be moved by the dough pieces guided thereover.

Instead of a roller, the means for applying an adhesive can for instance comprise a bath with adhesive adapted for guiding of the dough piece therethrough. Such a bath can be provided for this purpose with a screen or grid over which the dough pieces are guided through the adhesive. The screen or the grid can here be disposed relative to the adhesive present in the bath such that the dough piece only comes into contact with the adhesive on the underside, or be adapted to at least wholly immerse a part of the dough piece. This latter provides the option of for instance providing the dough piece with sprinkling material on the upper side as well as the underside.

In order to prevent fouling of the device and to enable reuse of sprinkling material which has not adhered to the dough piece, means can be provided for discharging, collecting and feeding back excess sprinkling material. These can for instance comprise a space between the first conveyor and a third conveyor, wherein the space is provided with a collecting means for collecting sprinkling material that has fallen between the first conveyor and the third conveyor. The third conveyor is herein adapted to transport dough pieces in substantially the same direction as the first conveyor, so that the dough pieces can be carried easily from the first conveyor to the third conveyor. The excess sprinkling material falls however in the space between (the transition from) the first and third conveyor, and is there preferably collected and discharged, which can also take place with a conveyor such as a belt. The discharged sprinkling material can be fed back, optionally automatically, to a device for sprinkling the surface.

In order to obtain an even better adhesion, the device can be further provided with pressing means for pressing the dough piece onto the sprinkling material, such as a pressing roller or guide.

BRIEF DESCRIPTION OF THE DRAWINGS

The invention will now be further elucidated with reference to the following non-limitative figures, in which.

DETAILED DESCRIPTION OF THE PREFERRED EMBODIMENTS

Figure 1:
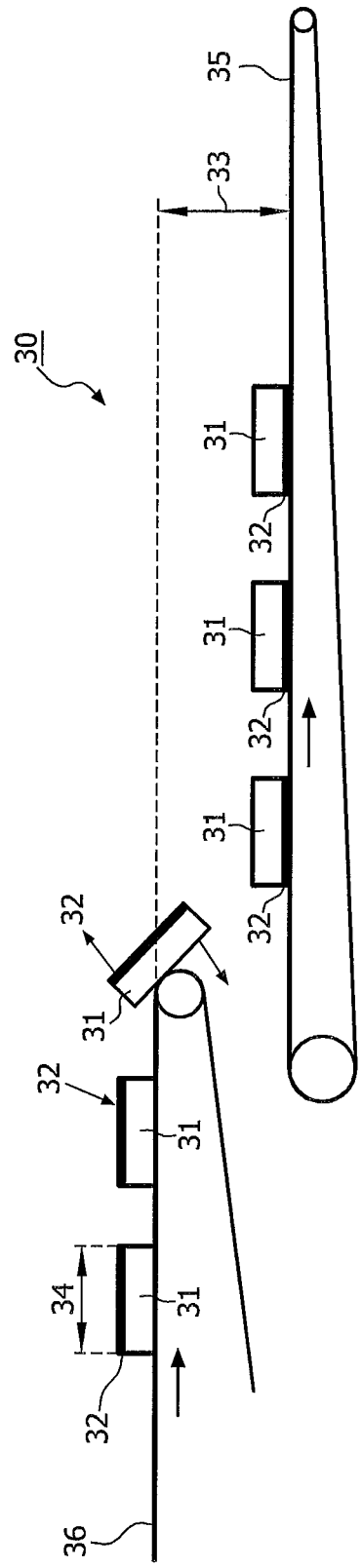
FIG. 1 shows a prior art device.

FIG. 1 shows a prior art device 30 for providing the underside of a dough piece with sprinkling material which is adapted to separate from an endless dough strip individual dough pieces 31 which are provided on an upper side with an adhesive and subsequently provided with a sprinkling material 32, this sprinkling material here being pressed on.

The pieces then drop over a predetermined height 33 in the device, wherein they should come to lie with the sprinkled sides facing downward. This process is impossible for endless dough pieces, but also for softer types of dough. The length 34 of dough pieces which can be processed in this manner is generally limited. In addition, the appropriate predetermined height 33 differs per product type, whereby the device has to be reset in each case. Nor can the exact location at which the reversed products drop from a first conveyor belt 36 onto a second conveyor belt 35 be properly determined, which can make further processing steps more difficult.

Figure 2A:
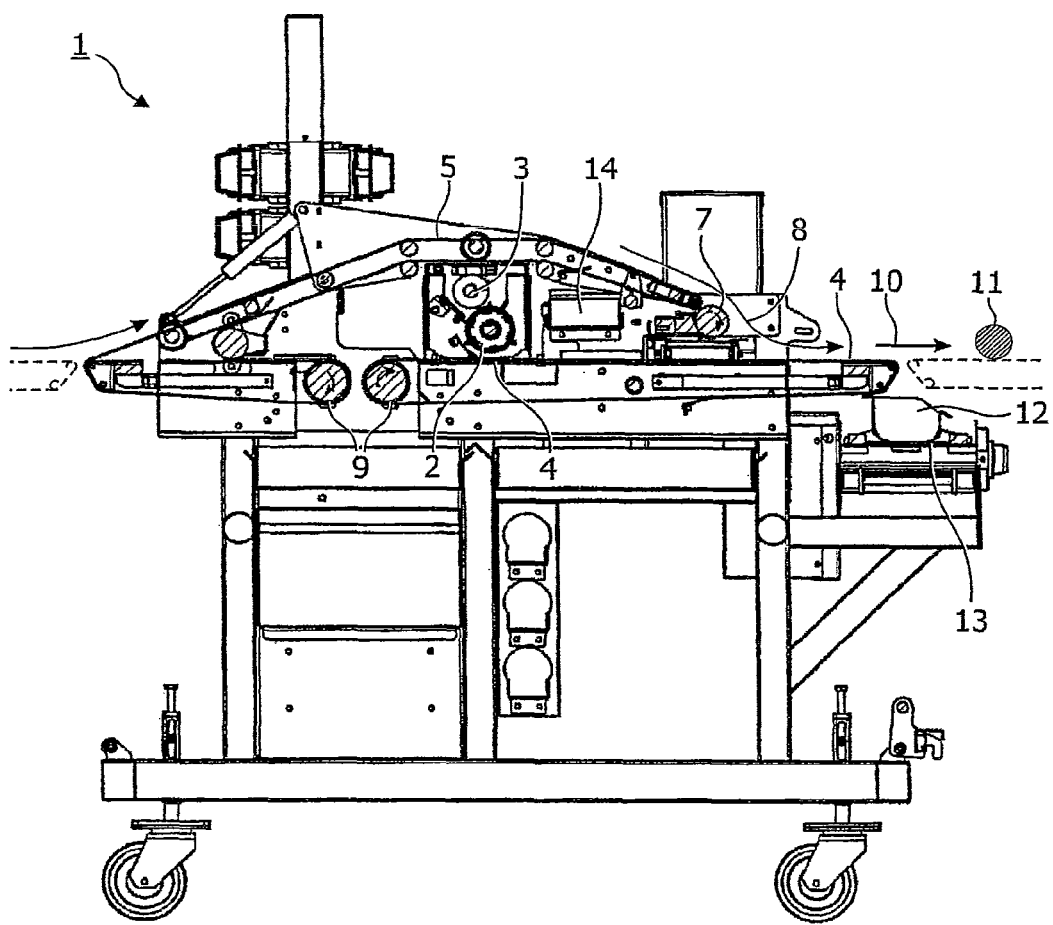
FIG. 2A shows a device 1 according to the present invention.

FIG. 2A shows a device 1 according to the present invention. The device comprises means for arranging sprinkling material, which is formed by a sprinkling roller 2 onto which sprinkling material is uniformly distributed by means of a worm wheel 3. A quantity of sprinkling material is herein arranged on first conveyor 4 such that, at least on those parts on which a dough strip will be placed, it will be fully covered with sprinkling material. First conveyor 4 is driven by drive 9 such that it transports the sprinkling material in the direction of arrow 10. Device 1 also comprises a second conveyor 5 adapted to place the dough piece on the first conveyor 4 provided with the sprinkling material. The second conveyor is adapted here such that it supplies the dough pieces in the direction of arrow 8 to the first conveyor.

Figure 2B:
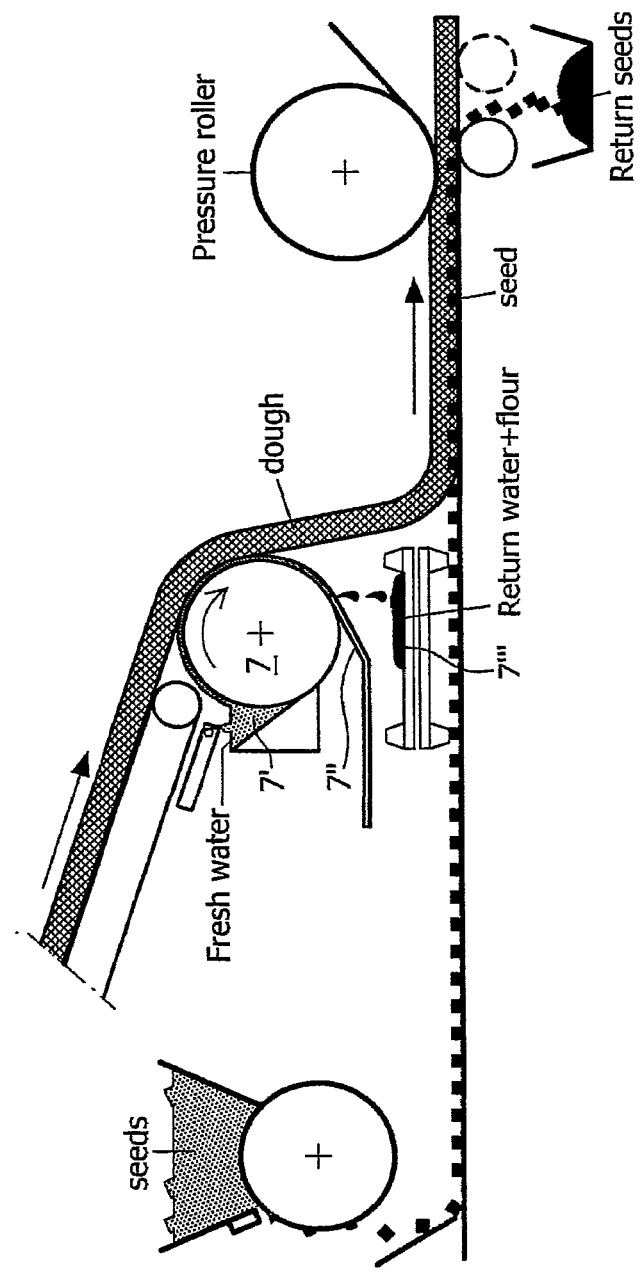
FIG. 2B shows a detail from FIG. 2A.

FIG. 2B shows roller 7 of FIG. 2A in more detail. Shown is that roller 7 is provided with means such as a liquid reservoir 7' where the roller is disposed rotatably for the purpose of entraining adhesive on its periphery in the rotation and subsequently dispensing this adhesive to the dough piece. The roller is particularly provided on a peripheral side with a covering which takes up the adhesive through absorption or through a "scooping" action of a relief on the outer side of the roller and which dispenses the adhesive when the dough piece comes into contact with the roller. Excess adhesive which does not adhere to the dough piece is here discharged to liquid reservoir 7' and a scraper device 7" prevents entrained dough entering the reservoir. The water possibly contaminated with dough can instead be discharged 7'''.

A roller 7 is further provided for applying an adhesive to the dough piece. This roller 7 is for instance moistened with water and is shown in detail in FIG. 2A. Roller 7 is disposed in the route for dough pieces as according to arrow 8 between the second conveyor and the first conveyor such that the dough pieces are carried over roller 7 and thus moistened on their eventual underside.

There is also a space between first conveyor 4 and a third conveyor 10 provided with a collecting means formed by gutter 12 for collecting sprinkling material falling between first conveyor 4 and third conveyor 10. This gutter 12 debouches in a fourth conveyor 13 which discharges the collected excess sprinkling material so that it can once again be sprinkled onto the first conveyor by sprinkling roller 2. The device further comprises a cleaning device 14 comprising a scraper for cleaning second conveyor 5. Also shown is pressing means 11 which ensures that a dough piece is pressed with some pressure onto the sprinkling material, this resulting in an even better adhesion. Pressing means 11 could also have been placed above conveyor 4.

Figure 3:
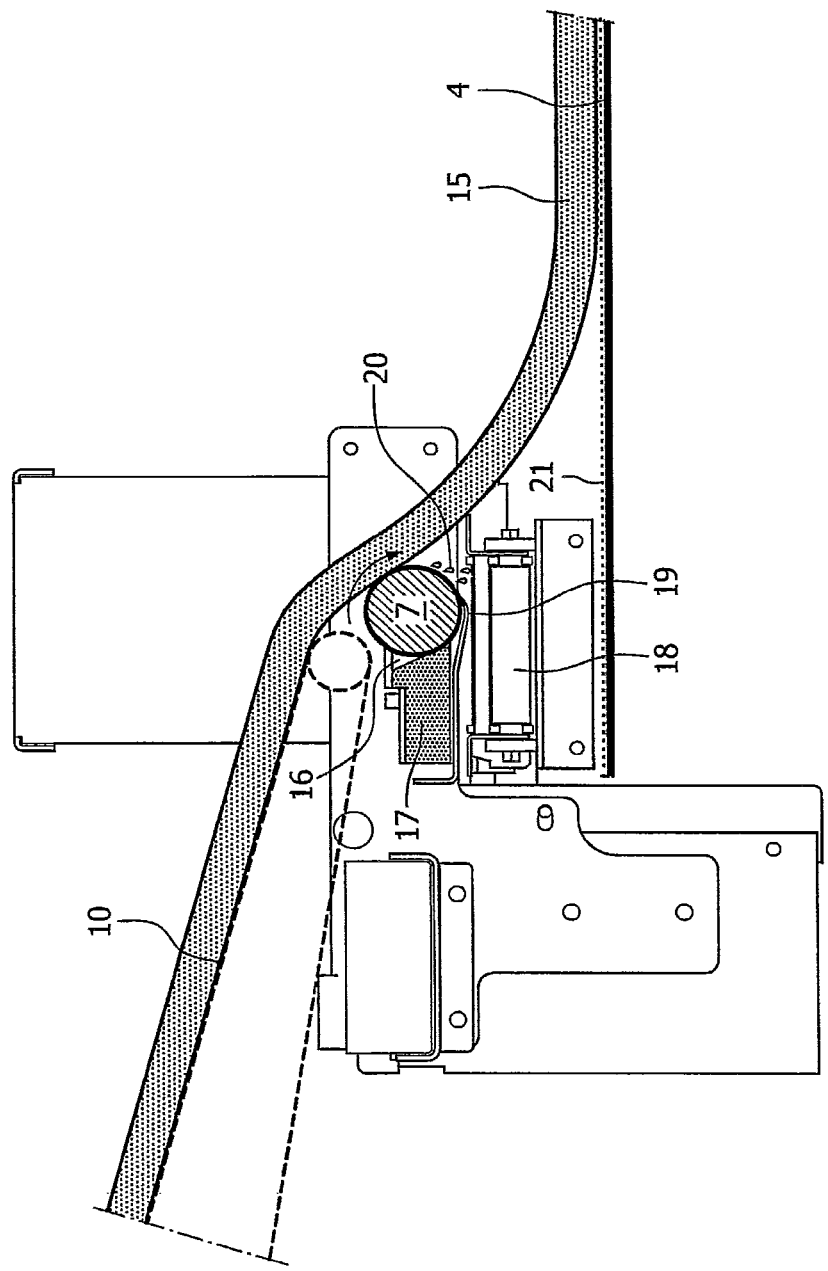
FIG. 3 shows the means for applying an adhesive layer to a dough piece.

FIG. 3 shows the means for applying an adhesive layer to a dough piece 15. Shown is roller 7 which is provided with a reservoir 17 into which the adhesive can be supplied via feed opening 16. The roller is preferably manufactured from stainless steel and therefore readily takes up adhesive from the reservoir. Provided on the underside of the roller is a scraper 19 for removing dough residues and excess adhesive from roller 7. These residues, together with droplets 20 of adhesive dropping from the roller or dough piece 15, are collected by a fifth conveyor 18 which ensures that they cannot drop onto the second conveyor 3 covered with sprinkling material 21.

Figure 4:
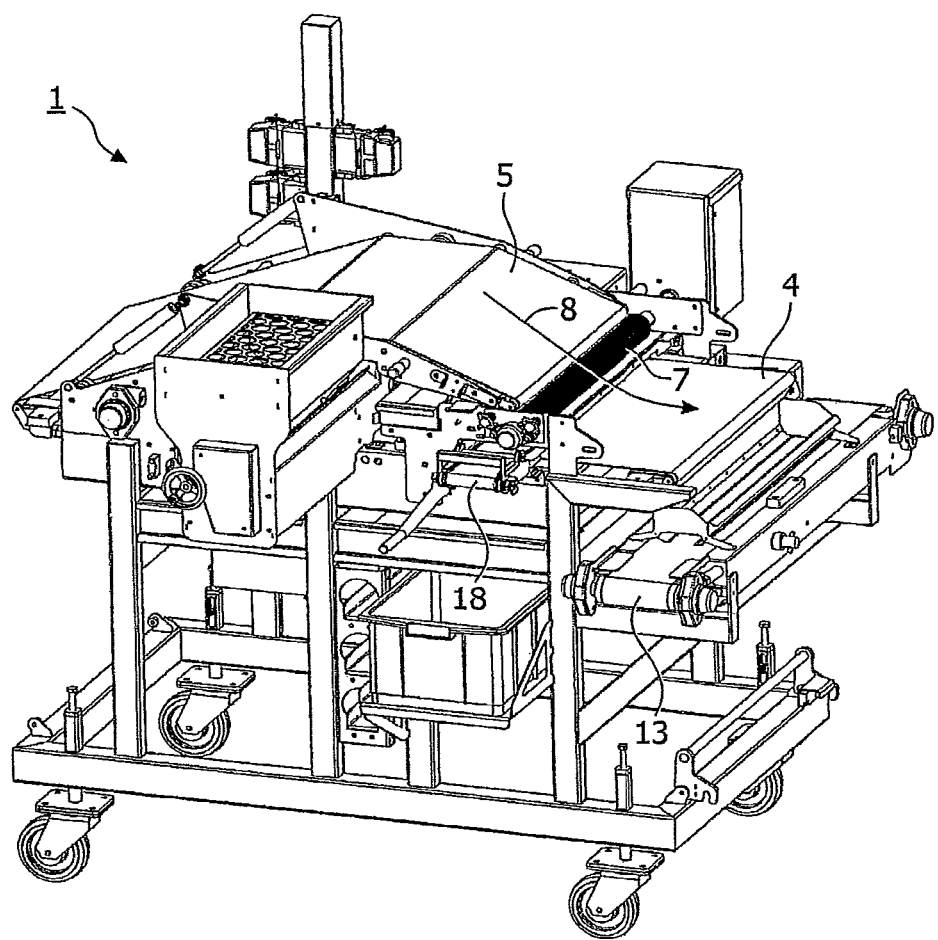
FIG. 4 is a perspective view of the device of FIG. 2A.

FIG. 4 shows a perspective view of the device of FIG. 2A, in which can be seen that fifth conveyor 18 for discharging adhesive which has dropped from roller 7 is adapted to discharge adhesive and other excess material from first conveyor belt 4 to second conveyor belt 5 with a directional component at right angles to the direction of transport as according to arrow 8, and that fourth conveyor 13 is also adapted to discharge excess sprinkling material from first conveyor belt 4 to second conveyor belt 5 with a directional component at right angles to the direction of transport as according to arrow 8.

The invention claimed is:

1. A device for arranging sprinkling material on at least the underside of a dough piece, comprising:
   at least one member for arranging the sprinkling material on a surface;
   at least one member for placing the dough piece on the surface provided with the sprinkling material,
   wherein during arranging of the sprinkling material the device leaves unchanged the side of the dough piece facing toward the surface and the side of the dough piece facing away from the surface, so that sprinkling material can be arranged on dough pieces of indefinite length, and
   wherein the device further includes at least one member for applying an adhesive, the at least one member for applying an adhesive comprising a roller, this roller being provided with at least one member, and wherein the roller is disposed rotatably for the purpose of entraining the adhesive on its periphery in rotation and subsequently dispensing the adhesive to the dough piece,
   wherein the at least one member provided with the roller includes a reservoir from which the roller entrains the adhesive.

2. The device of claim 1, wherein
   the at least one member for placing the dough piece is adapted to place the dough piece with a part of the dough piece provided with the adhesive facing toward the surface.

3. The device of claim 1, wherein the surface comprises a first conveyor for dough pieces.

4. The device of claim 3, wherein the at least one member for placing the dough piece comprises a second conveyor for dough pieces, wherein the second conveyor is adapted to place the dough piece, via the at least one member for applying the adhesive, onto the surface provided with the sprinkling material.

5. The device of claim 4, wherein the second conveyor is adapted to feed the dough piece over the roller in order to apply the adhesive to an underside of the dough piece.

6. The device of claim 4, further comprising at least one member for discharging excess sprinkling material, said at least one member comprising a space between the first conveyor and a third conveyor, wherein the space is provided with at least one member for collecting sprinkling material that has fallen between the first conveyor and the third conveyor.

7. The device of claim 1, wherein at least one member is provided under the roller for collecting adhesive dropping from the roller or the dough piece.

8. The device of claim 1, further comprising at least one member for discharging excess sprinkling material from the surface.

9. The device of claim 1, further comprising at least one member for pressing the dough piece onto the sprinkling material.

10. A device for arranging sprinkling material on at least the underside of a dough piece, comprising:
    a sprinkling roller for arranging the sprinkling material on a surface of a first conveyor for dough pieces;
    a second conveyor arranged above the surface of the first conveyor for placing the dough piece on the surface of the first conveyor provided with the sprinkling material; and
    a roller disposed at an end of the second conveyor above the surface of the first conveyor for applying an adhesive to the underside of the dough piece, the roller being provided with a reservoir positioned below the roller from which the roller entrains the adhesive and the roller being rotatably disposed for the purpose of entraining the adhesive on its periphery in rotation and subsequently dispensing the adhesive to the dough piece,
    wherein the second conveyor is adapted to feed the dough piece over the roller in order to apply adhesive to the underside of the dough piece and place the dough piece, via the roller, onto the surface of the first conveyor provided with the sprinkling material with the underside of the dough piece facing toward the surface of the first conveyor, and
    wherein the device is configured such that during arranging of the sprinkling material the device leaves unchanged underside of the dough piece facing toward the surface of the first conveyor provided with the sprinkling material and a side of the dough piece facing away from the surface of the first conveyor such that sprinkling material can be arranged on dough pieces of indefinite length.

* * * * *